(12) United States Patent
Yanagawa et al.

(10) Patent No.: US 7,016,285 B2
(45) Date of Patent: Mar. 21, 2006

(54) LINKING GAP DETECTING DEVICE AND METHOD OF OPTICAL RECORDING MEDIUM

(75) Inventors: Naoharu Yanagawa, Tokorozawa (JP);
Masafumi Asada, Tokorozawa (JP);
Takakazu Sugiyama, Tokorozawa (JP);
Yuji Shimizu, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 441 days.

(21) Appl. No.: 10/461,871

(22) Filed: Jun. 16, 2003

(65) Prior Publication Data

US 2004/0004924 A1 Jan. 8, 2004

(30) Foreign Application Priority Data

Jun. 17, 2002 (JP) ............................. 2002-176328
Jul. 4, 2002 (JP) ............................. 2002-195730

(51) Int. Cl.
*G11B 7/00* (2006.01)

(52) U.S. Cl. .................................. 369/53.34; 369/47.22

(58) Field of Classification Search .................... None
See application file for complete search history.

(56) References Cited

U.S. PATENT DOCUMENTS

| | | | | | |
|---|---|---|---|---|---|
| 5,475,664 | A | * | 12/1995 | Shimizume et al. | 369/44.29 |
| 5,629,924 | A | * | 5/1997 | Yokogawa et al. | 369/275.3 |
| 5,875,163 | A | * | 2/1999 | Kuroda et al. | 369/47.48 |
| 5,933,410 | A | * | 8/1999 | Nakane et al. | 369/275.3 |
| 6,925,041 | B1 | * | 8/2005 | Kai et al. | 369/47.51 |

* cited by examiner

*Primary Examiner*—Thang V Tran
*Assistant Examiner*—Tawfik Goma
(74) *Attorney, Agent, or Firm*—Sughrue Mion, PLLC (57) ABSTRACT

Linking gap detecting device and method in which a light beam is irradiated to an information recording track of an optical recording medium; a light detecting signal is generated by receiving reflected light of the light beam irradiated to the information recording track; a synchronous signal is detected from the light detecting signal; it is judged whether the existing interval of the synchronous signal lies outside a predetermined interval range or not; and the linking gap is detected on the basis of a result of the judgment.

13 Claims, 8 Drawing Sheets

LINKING GAP DETECTING DEVICE AND METHOD OF OPTICAL RECORDING MEDIUM

BACKGROUND OF THE INVENTION

1. Field of the Invention

The present invention relates to linking gap detecting device and method of an optical recording medium, etc.

2. Description of the Related Background Art

An optical disc such as CD-R, CD-RW, DVD-R, DVD-RW, and DVD-RAM is known at present as a recording medium of an optical type able to write an information signal. Further, an information recording/playing apparatus for recording and playing information data with respect to such an optical disc has been produced as a product.

It is generally possible to examine performance of the optical disc by measuring an error rate in a recording state of the information data. As a result of the measurement, the disc having a high error rate is judged as a bad recording state of the information data.

However, there is a case in which a linking gap is caused in the writable optical disc when new information data are continuously written in a position already written. The linking gap is a gap between a writing portion of the previous information data and a writing portion of the new information data.

In the above error rate measurement, when the linking gap is caused in the optical disc, a PLL circuit for synchronously outputting a read signal is operated and returns the optical disc to a normal play state immediately correspondingly to the next synchronous signal even when no synchronization is taken in this linking gap portion. Thus, the error rate only temporarily becomes worse, but no problem is caused. For example, in the standard of the case of the DVD-RW as an optical disc, it is determined that an LPP (land prepit) exists within the period of the synchronous signal of 14T (T is a unit mark length). The LPP is arranged in advance on a land track to know record timing and an address of the information data when a disc recorder records the information data. When the linking gap is caused, the phase relation of the synchronous signal of 14T and the LPP is shifted, but the PLL circuit is operated so as to recover this phase relation in 14T of the synchronous signal next read. Accordingly, even when the linking gap is caused, it is only a momentary change for the worse in the error rate measurement and this worse is approximately similar to the worse of the error rate caused by dirt and damage. Therefore, it is difficult to specify whether the worse of the error rate is caused by the linking gap.

However, when the amount of the linking gap is large, no standard of the optical disc can be satisfied and no normal play can be performed in an optical disc player which has not any good playing quality. For example, in screen image reproduction, the screen is frozen and a mosaic state is caused. Further, the same portion is repeatedly played in a certain player. Accordingly, it is desired to exactly detect the linking gap portion of the optical disc apart from the error rate measurement.

SUMMARY OF THE INVENTION

An object of the present invention is to provide linking gap detecting device and method able to quickly and exactly detect a linking gap of an optical recording medium.

A linking gap detecting device according to the present invention is a device for detecting a linking gap on an information recording track of an optical recording medium which has the information recording track and prepits on a recording face thereof, the information recording track in which marks indicating information data and marks each indicating a synchronous signal being formed, and the prepits being formed at intervals to indicate information relating to the information recording track between adjacent track portions of the information recording track, the linking gap detecting device comprising: a light beam irradiating device for irradiating a light beam to the information recording track; a light detector for receiving reflected light of the light beam irradiated to the information recording track to generate a light detecting signal; a synchronous detector for detecting a synchronous signal of the light detecting signal; and a synchronous interval judging device for judging whether an existing interval of the synchronous signal detected by the synchronous detector lies within a predetermined interval range or not; wherein the linking gap is detected on the basis of a result of the judgment by the synchronous interval judging device.

A linking gap detecting method according to the present invention is a method for detecting a linking gap on an information recording track of an optical recording medium which has the information recording track and prepits on a recording face thereof, the information recording track in which marks indicating information data and marks each indicating a synchronous signal being formed, and the prepits being formed at intervals to indicate information relating to the information recording track between adjacent track portions of the information recording track, the linking gap detecting method comprising the steps of: irradiating a light beam to the information recording track; receiving reflected light of the light beam irradiated to the information recording track to generate a light detecting signal; detecting a synchronous signal of the light detecting signal; and judging whether an existing interval of the synchronous signal detected lies within a predetermined interval range or not; wherein the linking gap is detected on the basis of a result of the judgment.

DETAILED DESCRIPTION OF THE INVENTION

The embodiments of the present invention will next be explained in detail with reference to the drawings.

Figure 1:
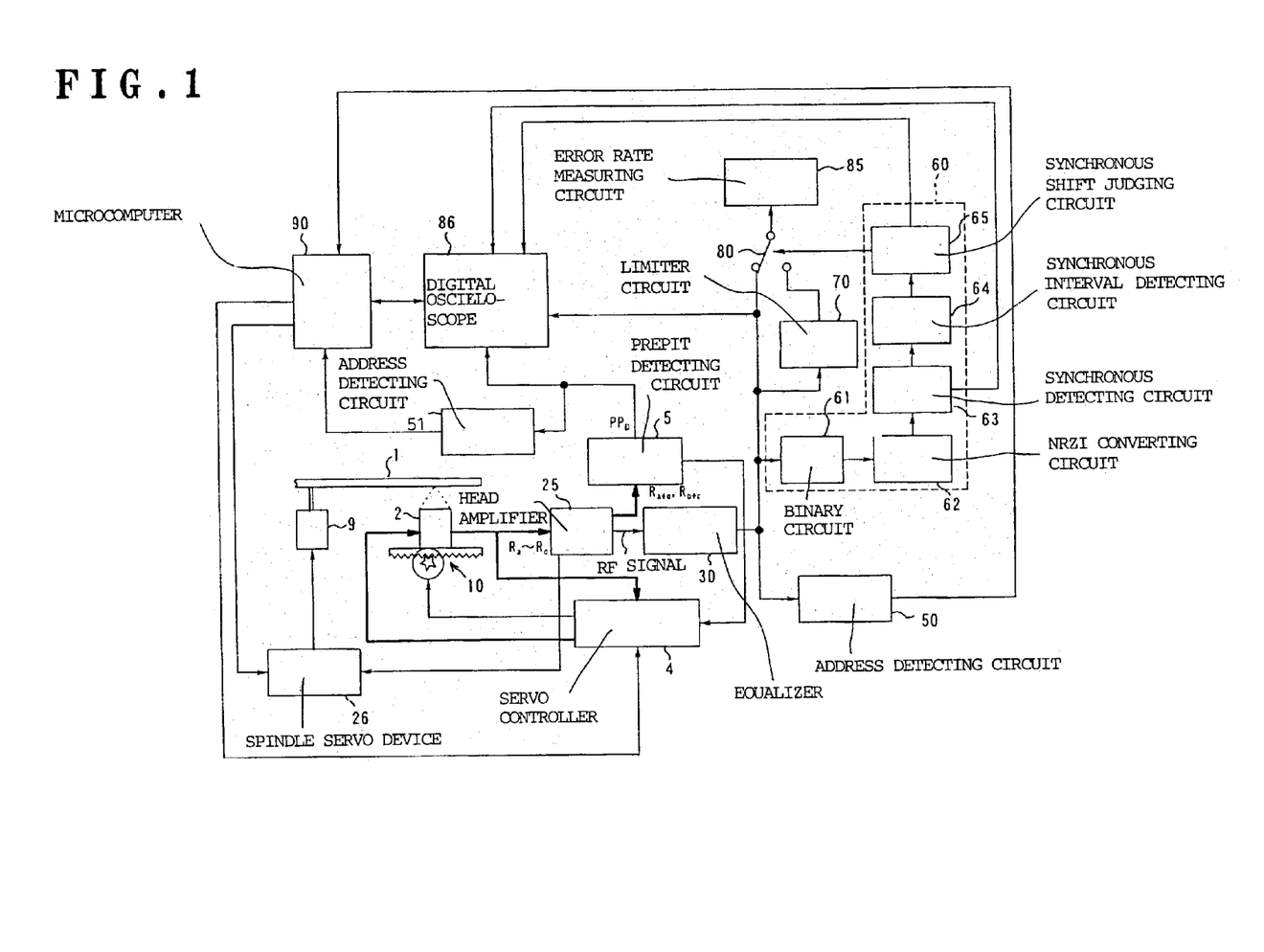
FIG. 1 is a block diagram showing the construction of a waveform measuring device to which the present invention is adopted.
Figure 2:
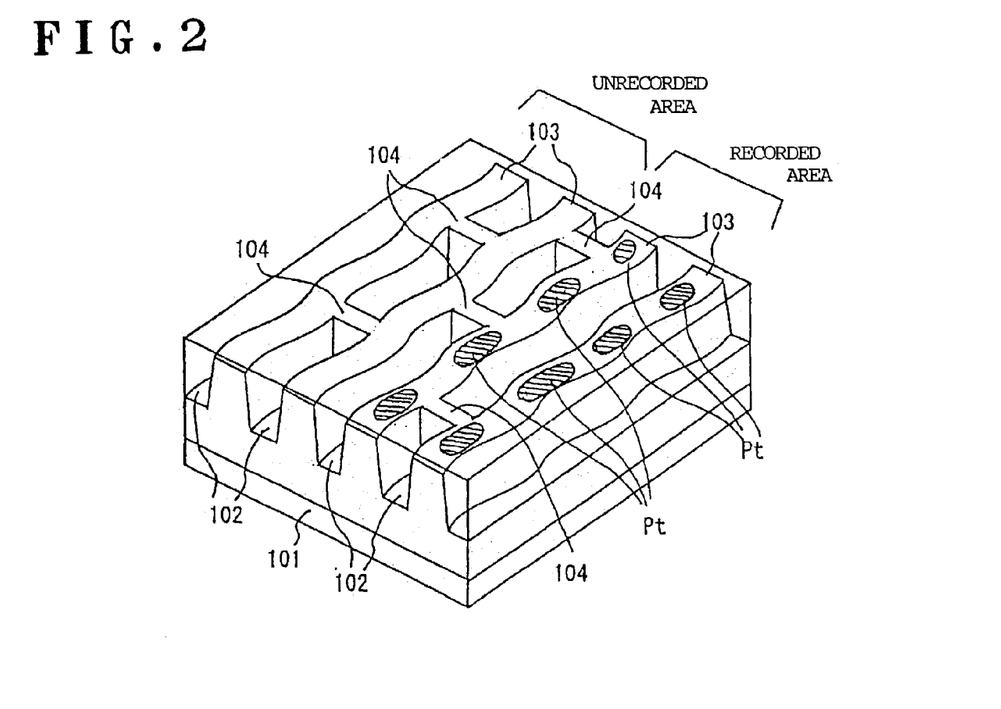
FIG. 2 is a view showing the structure of a recording face of DVD-RW.

FIG. 1 shows a waveform measuring device to which a liking gap detecting device according to the present invention is adopted. In the waveform measuring device, for example, an optical disc 1 as a measuring object has a recording face as shown in FIG. 2. Namely, a convex groove track 103 for forming information pits (marks) Pt which indicate information data and a concave land track 102 are alternately formed in a spiral shape or a concentric circle shape on a disc substrate 101. Further, plural LPPs (land prepits) 104 are formed between groove tracks (track portions) 103 adjacent to each other. The LPP 104 is previously arranged on the land track 102 to know record timing and an address of the information data when a disc recorder records the information data.

In the waveform measuring device, a reading beam light generator (not shown) and a 4-divisional photodetector (reference numeral 20 of FIG. 3) are mounted into a record-play head 2 to read record information from the optical disc 1.

Figure 3:
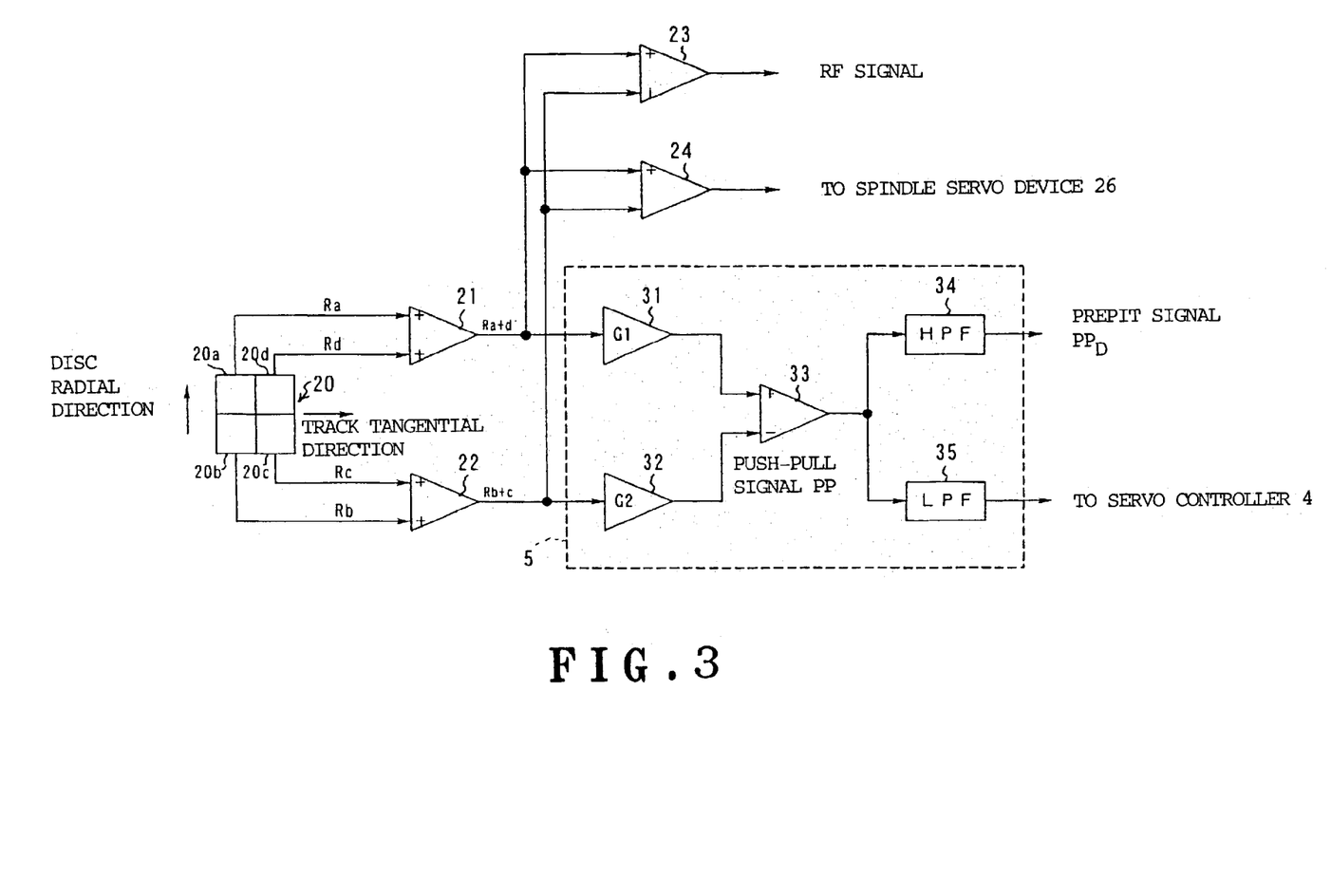
FIG. 3 is a block diagram showing the constructions of a head amplifier and a prepit detecting circuit in the waveform measuring device of FIG. 1.

The reading beam light generator irradiates reading beam light to the optical disc 1 rotated by a spindle motor 9 and forms an information reading spot on its recording face. As shown in FIG. 3, the 4-divisional photodetector 20 is constructed by photoelectric converting elements having light receiving faces 20a to 20d divided into four in the direction along the tangential line of an information recording track (groove track 103) of the optical disc 1 and the direction perpendicular to the tangential line of the recording track. The photoelectric converting element receives reflected light from the optical disc 1 by the information reading spot by each of the four light receiving faces 20a to 20d, and individually converts each received light to an electric signal and outputs the electric signal as each of light receiving signals Ra to Rd.

A servo controller 4 generates a focus error signal and a slider driving signal on the basis of these light receiving signals Ra to Rd. Further, the servo controller 4 generates a tracking error signal on the basis of an output signal from a prepit detecting circuit 5 described later. The focus error signal is supplied to a focusing actuator (not shown) mounted to the record-play head 2. The focusing actuator adjusts the focal point of the information reading spot on the basis of the focus error signal. The tracking error signal is supplied to a tracking actuator (not shown) mounted to the record-play head 2. The tracking actuator adjusts the forming position of the information reading spot in a disc radial direction on the basis of the tracking error signal. The slider driving signal is supplied to a slider 10. The slider 10 moves the record-play head 2 in the disc radial direction at a speed corresponding to the slider driving signal.

The above light receiving signals Ra to Rd are supplied to a head amplifier 25 having adders 21 to 23 and a subtracter 24. The adder 21 adds light receiving signals Ra, Rd, and the adder 22 adds light receiving signals Rb, Rc. Namely, the adder 21 adds the light receiving signals Ra and Rd obtained by receiving light by the respective light receiving faces 20a and 20d of the 4-divisional photodetector 20 to each other, and outputs an added light receiving signal $R_{a+d}$. The adder 22 adds the light receiving signals Rb and Rc obtained by receiving light by the respective light receiving faces 20b and 20c of the 4-divisional photodetector 20 to each other, and outputs an added light receiving signal $R_{b+c}$.

The adder 23 adds the respective output signals $R_{a+d}$ and $R_{b+c}$ of the adders 21, 22. An output signal of the adder 23 is a read signal, i.e., an RF signal, and is supplied to an equalizer 30, an address detecting circuit 50, a synchronous shift detecting circuit 60, a limiter circuit 70 and a changeover switch 80.

The equalizer 30 is arranged to improve play characteristics by increasing a high frequency component level of the read signal.

The subtracter 24 subtracts the output signal $R_{b+c}$ of the adder 22 from the output signal $R_{a+d}$ of the adder 21. An output signal of the subtracter 24 becomes a signal showing a frequency provided by wobbling of the above groove track 103, and is supplied to a spindle servo device 26 of the spindle motor 9. The spindle servo device 26 rotates the spindle motor 9 such that the frequency obtained from the output signal of the subtracter 24 becomes a frequency corresponding to a predetermined rotating speed.

The prepit detecting circuit 5 detects the land prepit (LPP) 104 formed on the land track (prepit track) 102 of the optical disc 1 as shown in FIG. 2 on the basis of the respective output signals of the adders 21, 22, in order to supply a prepit signal $PP_D$ to an address detecting circuit 51 and an oscilloscope 86.

As shown in FIG. 3, the prepit detecting circuit 5 is constructed by an amplifier 31 for amplifying the output signal $R_{a+d}$ of the adder 21, an amplifier 32 for amplifying the output signal $R_{b+c}$ of the adder 22, a subtracter 33 for subtracting an output signal of the amplifier 32 from an output signal of the amplifier 31 and outputting the subtracted signal, a high pass filter (HPF) 34 for passing a high frequency component of the output signal of the subtracter 33, and a low pass filter (LPF) 35 for passing a low frequency component of the output signal of the subtracter 33. A gain G1 of the amplifier 31 and a gain G2 of the amplifier 32 are set to G1=G2.

The output signal of the subtracter 33 is called a push-pull signal PP, and the prepit signal $PP_D$ indicates a stuck-out component of the push-pull signal PP. Accordingly, the prepit signal PPD is obtained by passing a high frequency component of the push-pull signal PP by the HPF 34.

A binary circuit for generating a prepit signal binarized by comparing the output of the HPF 34 with a predetermined threshold value may be also arranged.

Each of the address detecting circuit 50 and the address detecting circuit 51 is a circuit for detecting an address at the irradiating position of the reading beam. The address detecting circuit 50 detects the address at the irradiating position of the reading beam in accordance with the RF signal. The address detecting circuit 51 detects the address at the irradiating position of the reading beam in accordance with the prepit signal $PP_D$.

The synchronous shift detecting circuit 60 is constructed by a binary circuit 61, an NRZI (Non Return to Zero Inverted) converting circuit 62, a synchronous detecting circuit 63, a synchronous interval detecting circuit 64 and a synchronous shift judging circuit 65. The binary circuit 61 binarizes the RF signal at a predetermined threshold value TH1 to supply the binarized signal to the NRZI converting circuit 62 as a pulse signal. The pulse signal has a pulse width corresponding to the length of a mark recorded to the disc 1. The NRZI converting circuit 62 NRZI-converts the supplied pulse signal to supply the converted signal to the synchronous detecting circuit 63. The synchronous detecting circuit 63 detects a pulse portion (a portion corresponding to logic '1') corresponding to 14T as a synchronous signal from the NRZI-converted signal. The synchronous interval detecting circuit 64 detects the interval of the synchronous signal detected by the synchronous detecting circuit 63 to supply a synchronous interval signal showing the interval of the synchronous signal to the synchronous shift judging circuit 65. The synchronous shift judging circuit 65 judges whether the interval of the synchronous signal lies within a range of 55 μsec ±14T or not. When the interval of the synchronous signal lies outside the range of 55 μsec ±14T, the synchronous shift judging circuit 65 generates a synchronous shift detecting pulse signal. The synchronous shift detecting pulse signal is generated as a control signal of the change-over switch 80. The 55 μsec is an existing interval value of the synchronous signal of 14T at 1× speed (one-time speed) of the disc 1. At n-times speed, the above numeric value is naturally divided by n. The 55 μsec ±14T corresponds to 55 μsec ±0.518 μsec.

The change-over switch 80 has two inputs, and the RF signal is supplied from the adder 23 to one of these two inputs. An output signal of the limiter circuit 70 is supplied to the other input. The limiter circuit 70 decreases the amplitude of the RF signal from the adder 23 to output the decreased amplitude to the other input of the change-over switch 80. The decrease in the amplitude of the RF signal made by the limiter circuit 70 is a decrease made to such an extent that no contents of the RF signal can be read and a format error is caused. A movable contact of the change-over switch 80 is normally in a selecting state of one input. However, when the synchronous shift detecting pulse signal is supplied from the synchronous shift judging circuit 65, the movable contact is switched to the selection of the other input for only a generating period of the synchronous shift detecting pulse signal. The movable contact of the change-over switch 80 becomes an output, and an error rate measuring circuit 85 is connected to the output. The error rate measuring circuit 85 calculates an error rate in accordance with a byte number corrected in an ECC block unit and a correction unable line number with respect to the supplied RF signal. Since the calculation of the error rate is known, its detailed explanation is omitted here.

The RF signal from the above equalizer 30, the prepit signal $PP_D$ from the prepit detecting circuit 5, the synchronous signal from the synchronous detecting circuit 63, and the synchronous shift detecting pulse signal from the synchronous shift judging circuit 65 are supplied to the oscilloscope 86. Since the oscilloscope 86 is a digital oscilloscope and has e.g., the inputs of four channels, their supply signal waveforms are simultaneously observed.

A microcomputer 90 is connected to the oscilloscope 86. The concrete construction of the microcomputer 90 is not shown, but the microcomputer 90 includes at least a CPU and an internal memory.

The connection between the microcomputer 90 and the oscilloscope 86 is based on an interface standard such as GPIB, 10BASE-T or RS-232C.

The microcomputer 90 is constructed such that a detecting output signal of each of the address detecting circuits 50, 51 is supplied to the microcomputer 90.

Figure 4:
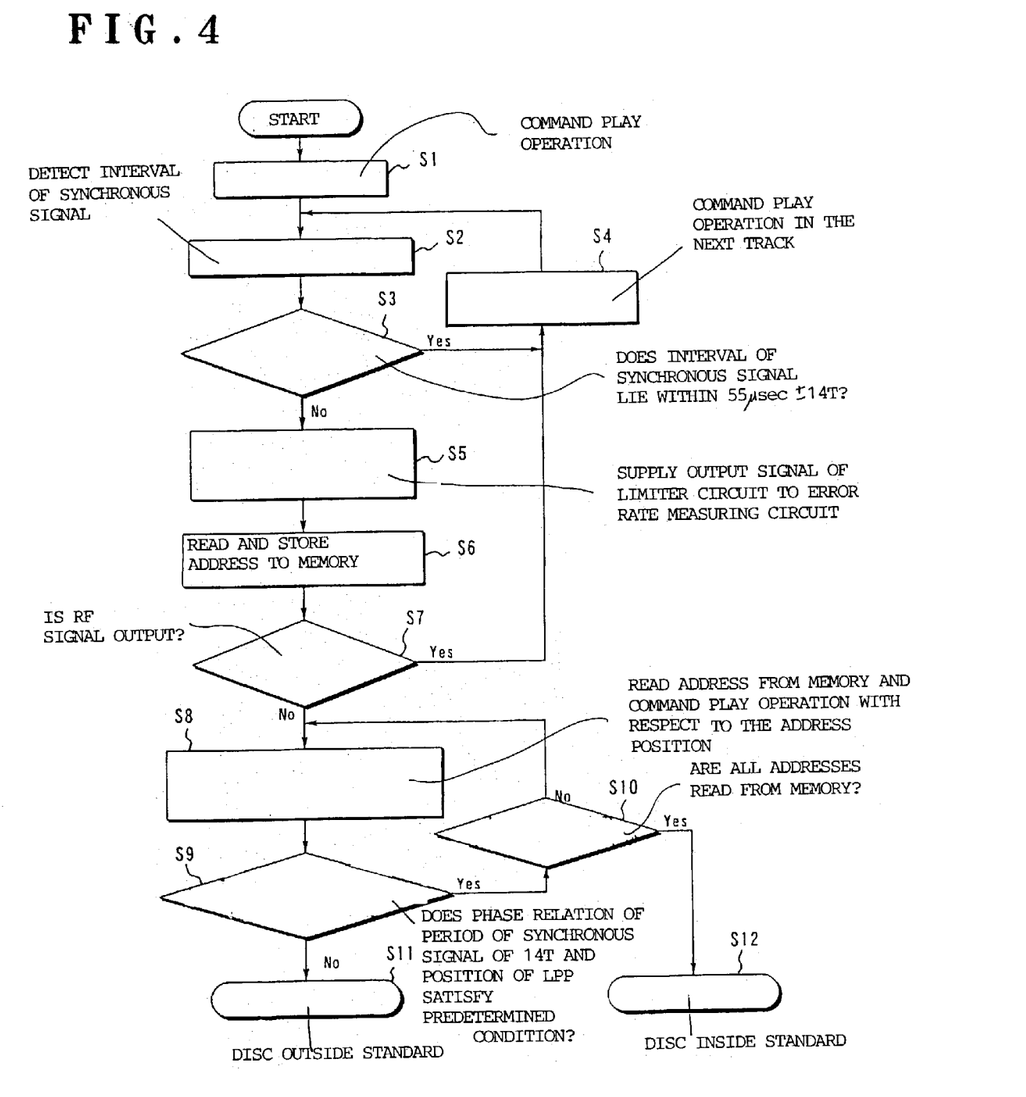
FIG. 4 is a flow chart showing linking gap judgment processing.

In the waveform measuring device of the above construction, the microcomputer 90 performs linking gap judgment processing as shown in FIG. 4. In the linking gap judgment processing, the microcomputer 90 first starts a play operation with respect to the optical disc 1 (step S1). In the play operation, all the servo systems of a spindle servo, a tracking servo, a focus servo, etc. are set to a close state so as to perform a reading operation from a read-in area of the optical disc 1 by the record-play head 2. In the state of the play operation, the interval of the synchronous signal of 14T is detected by the synchronous detecting circuit 63 and the synchronous interval detecting circuit 64 (step S2). An RF signal is binarized by the binary circuit 61 and is then NRZI-converted and is further supplied to the synchronous detecting circuit 63. The synchronous interval detecting circuit 64 detects the interval from the previous synchronous signal to the present synchronous signal every time the synchronous detecting circuit 63 detects the synchronous signal of 14T.

The synchronous shift judging circuit 65 judges whether the interval of the synchronous signal lies within the range of 55 μsec ±14T or not (step S3). If the synchronous signal interval lies within the range of 55 μsec ±14T in the judgment of the synchronous shift judging circuit 65, the synchronous signal interval is normal so that the play operation in the next track is continuously performed as it is (step S4). In the normal state of the synchronous signal interval, the RF signal from the adder 23 is supplied to the error rate measuring circuit 85 as it is through the change-over switch 80, and a reading error rate is measured.

In contrast to this, when the synchronous signal interval lies outside the range of 55 μsec ±14T in the judgment of the synchronous shift judging circuit 65, the synchronous shift judging circuit 65 generates a synchronous shift detecting pulse signal, and the change-over switch 80 supplies the output signal of the limiter circuit 70 to the error rate measuring circuit 85 in response to the synchronous shift detecting pulse signal (step S5).

Figure 5:
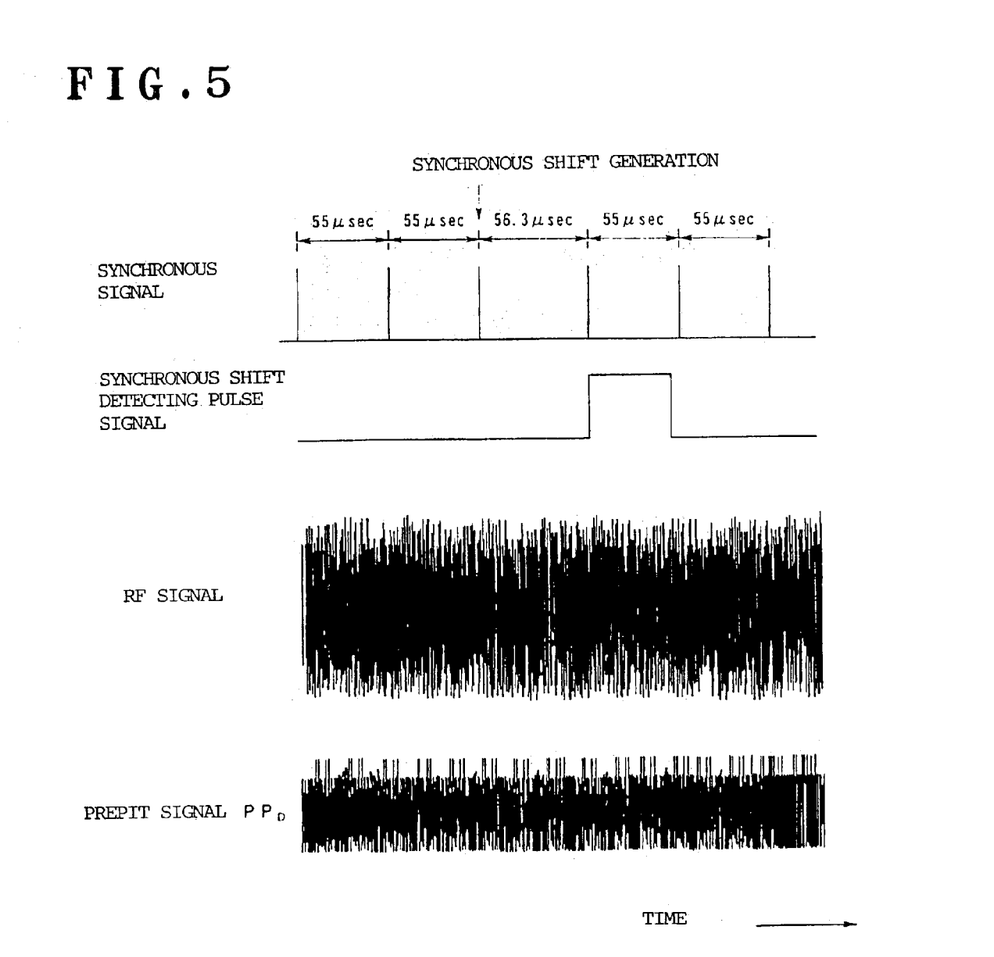
FIG. 5 are views showing a synchronous signal, a generating time point of a synchronous shift, a synchronous shift detecting pulse signal, an RF signal and a prepit signal.

FIG. 5 shows the relation of the RF signal and the prepit signal $PP_D$, the synchronous signal from the synchronous detecting circuit 63, and the synchronous shift detecting pulse signal from the synchronous shift judging circuit 65, displayed in the oscilloscope 86.

Here, the interval from the synchronous signal shown by an arrow to a synchronous signal located rightward by one is 56.3 μsec. Since the interval lies outside the range of 55 μsec ±14T (55 μsec ±0.518 μsec), the synchronous shift detecting pulse signal is generated.

Since the RF signal decreased in amplitude is supplied from the limiter circuit 70 to the error rate measuring circuit 85 through the change-over switch 80 during the generation of the synchronous shift detecting pulse signal, the measured error rate reliably becomes worse.

Since the synchronous shift detecting pulse signal from the synchronous shift judging circuit 65 is supplied to the microcomputer 90, the microcomputer 90 reads an address detected by the address detecting circuit 50 or the address detecting circuit 51 in accordance with this synchronous shift detecting pulse signal, and stores the address to an internal memory (step S6). Namely, the address of a linking gap portion having a synchronous signal interval outside the range of 55 μsec ±14T, i.e. the address of a portion making the error rate worse is written to the internal memory.

After the microcomputer 90 executes the step S6, the microcomputer 90 judges whether the RF signal is continuously output or not (step S7). For example, this can be confirmed from the existence of the RF signal waveform in the oscilloscope 86. If the RF signal is continuously output, the play operation in the next track is performed (step S4), and the above operations are repeated. In contrast to this, if no RF signal is output, the play of an area recording the information data in the optical disc 1 is terminated. At this time point, all the addresses of the linking gap portion having the synchronous signal interval outside the range of 55 μsec ±14T in the optical disc 1 are written to the internal memory of the microcomputer 90.

When the microcomputer 90 judges that there is no RF signal in the step S7, the microcomputer 90 reads one address from the internal memory writing the addresses thereto, and issues commands for performing the play operation of the disc 1 with respect to the one address (step S8). A reading operation from the command address position of the optical disc 1 using the record-play head 2 is then performed. In this state of the play operation, it is judged whether the phase relation of the period of the synchronous signal of 14T and the LPP satisfies predetermined conditions or not (step S9). The predetermined conditions are as follows. (1) The time difference between the peak position of an LPP waveform and a half position of the period of the synchronous signal of 14T lies within ±259.25 nsec, and (2) the interval of the synchronous signal lies within 55 $\mu$sec ±0.518 $\mu$sec. If these predetermined conditions (1) and (2) are satisfied, it is judged whether all the addresses are read from the internal memory or not (step S10). If all the addresses are not read, it is returned to the step S8 and the next one address is read and commands for performing the play operation of the disc 1 are given with respect to this address.

Figure 6:
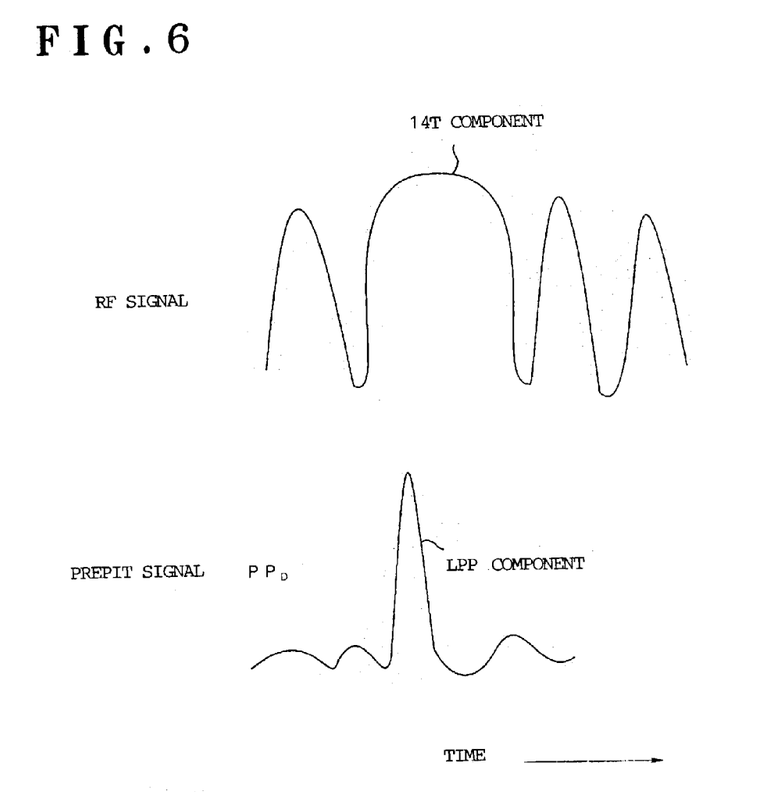
FIG. 6 is a view showing the phase relation of a 14T component of the synchronous signal of the RF signal and an LPP component of a push-pull signal.

For example, as shown in FIG. 6, when no phase relation of the synchronous signal component having 14T of the RF signal and the prepit signal $PP_D$ (LPP component) satisfies the predetermined conditions, i.e., when both the above (1) and (2) are not satisfied, it is judged that the optical disc 1 lies outside the standard, and the linking gap judgment processing with respect to the optical disc 1 is terminated (step S11).

In contrast to this, if all the addresses are read in the step S10, there is no problem in the play with respect to the linking gap existing in the optical disc 1. Accordingly, it is judged that the optical disc 1 lies within the standard, and the linking gap judgment processing is terminated (step S12).

Thus, the linking gap position is detected by performing the synchronous shift judgment processing, and it is possible to judge whether the linking gap lies within the standard of the optical disc or not.

Figure 7:
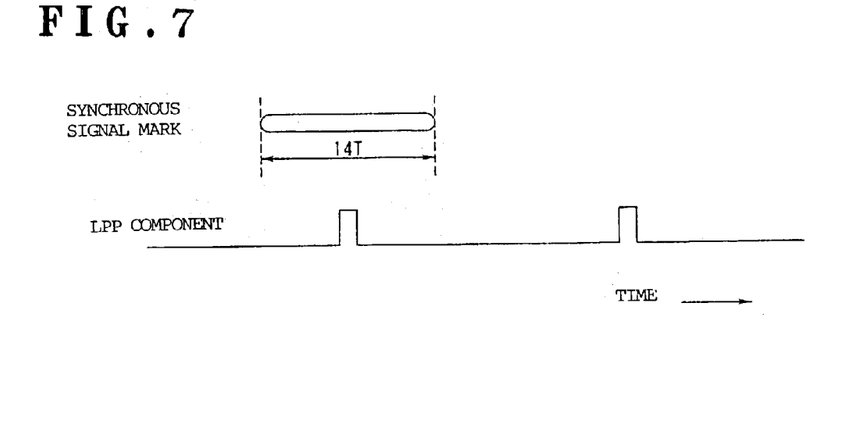
FIG. 7 is a view showing the relation of a synchronous signal mark and the LPP component.

In the above embodiment, it is based on a DVD-R/RW book (standard book) that the shift of the interval of the synchronous signal of 14T is 55 $\mu$sec ±14T (55 $\mu$sec ±0.518 $\mu$sec), and the time difference between the position of the LPP component and the half position of the period of the synchronous signal of 14T lies within ±259.25 nsec. In the DVD-R/RW book, the position relation of a synchronous signal mark of 14T and an LPP is shown as shown in FIG. 7. The shift amount of the interval of the synchronous signal can be also allowed from an amount actually causing a problem in an optical disc player to an amount of about 55 $\mu$sec ±20T.

Namely, the waveform measuring device shown in the above embodiment can be constructed such that the synchronous shift detecting circuit 60 generates the synchronous shift detecting pulse signal when the allowance range is from −50T to −20T and from +20T to +50T with respect to the interval (55 $\mu$sec) of the synchronous signal of 14T. When the shift amount is greater than the allowance range, it is supposed that a problem such as a track jump, etc. is caused by other factors such as a defect, etc. The synchronous shift detecting circuit 60 does not generate the synchronous shift detecting pulse signal.

Figure 8:
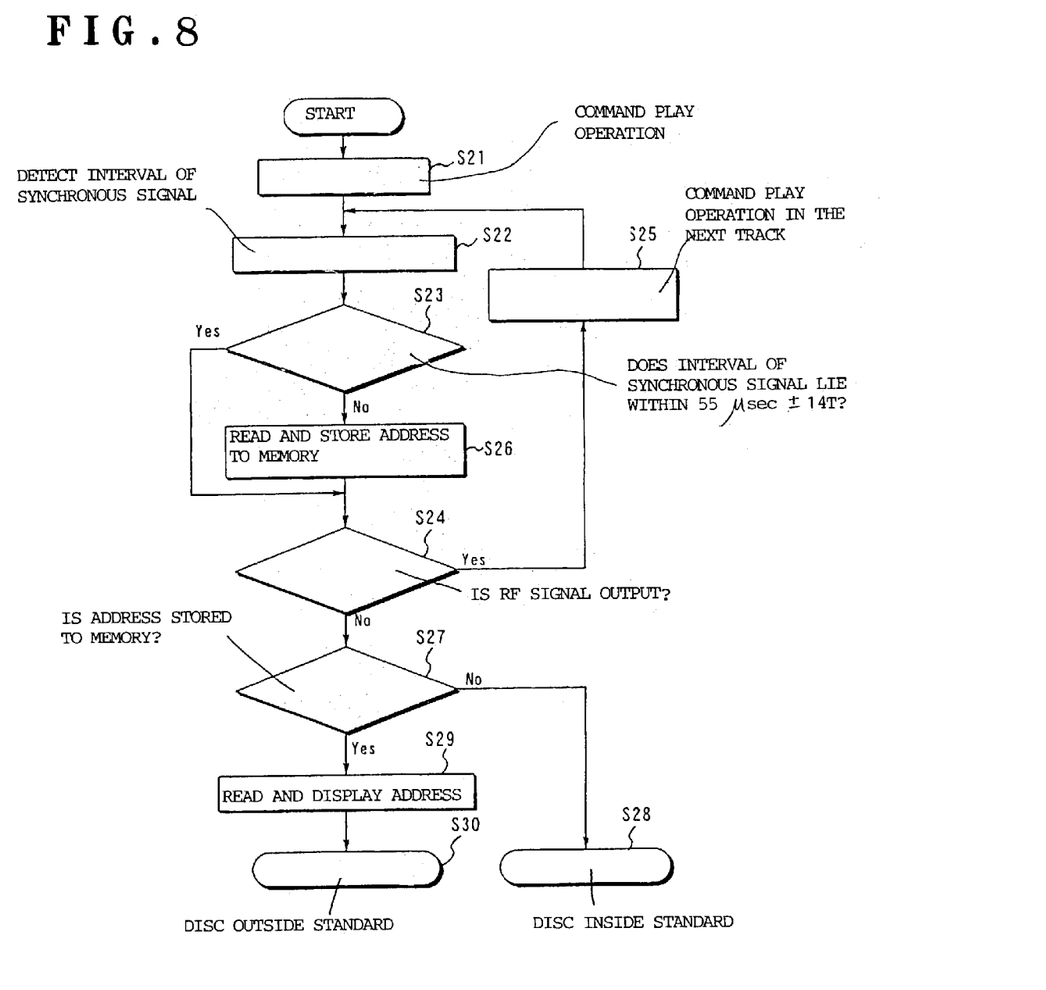
FIG. 8 is a flow chart showing the linking gap judgment processing.

FIG. 8 shows another example of the above linking gap judgment processing. In the linking gap judgment processing of FIG. 8, the microcomputer 90 first starts the play operation with respect to the optical disc 1 (step S21). In this state of the play operation, the interval of the synchronous signal of 14T is detected by the synchronous detecting circuit 63 and the synchronous interval detecting circuit 64 (step S22). When the interval of the synchronous signal is detected, the synchronous shift judging circuit 65 judges whether the interval of the synchronous signal lies in the range of 55 $\mu$sec ±14T or not (step S23). If the synchronous signal interval lies within the range of 55 $\mu$sec ±14T in the judgment of the synchronous shift judging circuit 65, the synchronous signal interval is normal so that it is judged whether an RF signal is continuously output or not (step S24). If the RF signal is continuously output, the play operation in the next track is performed (step S25), and the above operations are repeated.

If the synchronous signal interval lies outside the range of 55 $\mu$sec ±14T in the judgment of the synchronous shift judging circuit 65 in the step S23, the synchronous shift detecting pulse signal from the synchronous shift judging circuit 65 is supplied to the microcomputer 90. Accordingly, the microcomputer 90 reads an address detected by the address detecting circuit 50 or the address detecting circuit 51 in accordance with this synchronous shift detecting pulse signal, and stores the address to the internal memory (step S26). Thereafter, it proceeds to the step S24, and the existence of the RF signal is confirmed and the play operation in the next track is performed, and the above operations are repeated.

If no RF signal is output in the step S24, the play of an area where information data has recorded on the optical disc 1 is terminated. In this case, it is judged whether or not the address is stored to the internal memory by executing the step S26 (step S27). When no address is stored to the internal memory, it is judged that the optical disc 1 lies within the standard so that the linking gap judgment processing is terminated (step S28). In contrast to this, when addresses are stored to the internal memory, all the addresses are read and displayed in a display device (not shown) (step S29). It is then judged that the optical disc 1 lies outside the standard, and the linking gap judgment processing with respect to the optical disc 1 is terminated (step S30). In the display device, addresses causing the synchronous shift of the optical disc 1 are displayed as e.g., a list.

Steps S21 to S23 of the above linking gap judgment processing of FIG. 8 are the same as steps S1 to S3 of the linking gap judgment processing of FIG. 4. Similarly, steps S26, S24 and S25 are the same as steps S6, S7 and S4.

Figure 9:
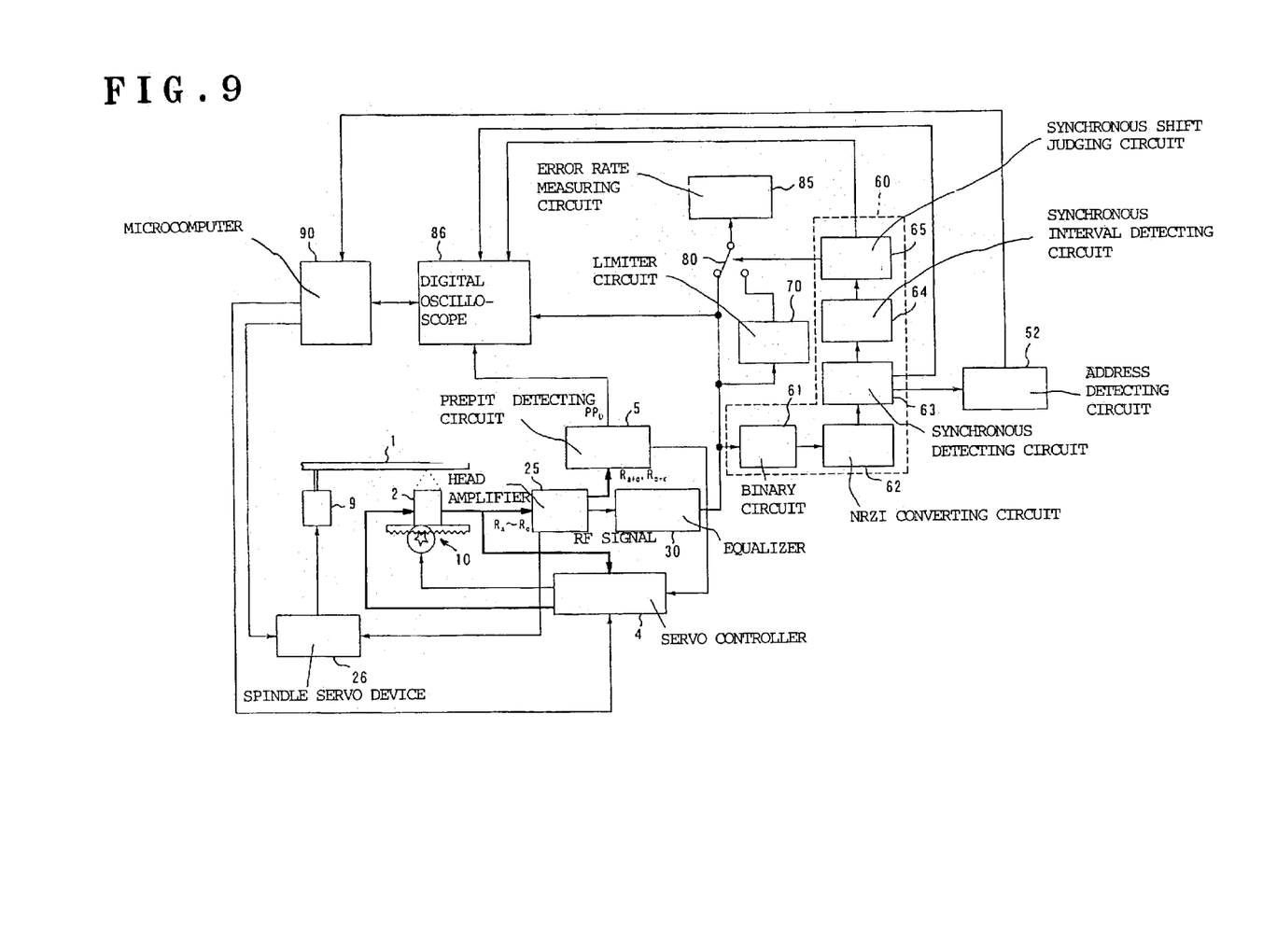
FIG. 9 is a block diagram showing the construction of a waveform measuring device as another embodiment of the present invention.

FIG. 9 shows a waveform measuring device as another embodiment of the present invention. In the same portions as the waveform measuring device shown in FIG. 1, the same reference numerals are used. In the waveform measuring device of FIG. 9, an address detecting circuit 52 is connected to the synchronous detecting circuit 63. The address detecting circuit 52 detects an address at a synchronous detecting time of the synchronous detecting circuit 63, and supplies the detected address to the microcomputer 90. The other constructions are similar to those of the waveform measuring device of FIG. 1 except for the address detecting circuits 50 and 51. In the waveform measuring device of FIG. 9, the above synchronous shift judgment processing is also executed.

In each of the above embodiments, the limiter circuit 70 decreases the amplitude of the RF signal, and the output signal Of the limiter circuit 70 is supplied to the error rate measuring circuit 85 through the change-over switch 80 during the generation of the synchronous shift detecting pulse signal. However, each of the above embodiments may be also constructed such that no RF signal is supplied to the error rate measuring circuit 85 during the generation of the synchronous shift detecting pulse signal.

In the explanation of each of the above embodiments, the present invention is applied to the waveform measuring device of the optical disc, but is not limited to the device. For example, if the linking gap position detecting device according to the present invention is arranged within a DVD-RW recorder, a record can be remade in a linking gap portion and the generation of a screen freeze and a mosaic can be prevented. When a disc, in which the linking gap portion is frequently generated, is played, reasons for generating deterioration of a reproduced screen image can be notified to a user.

In each of the above embodiments, the oscilloscope 86 is arranged, but each signal for the observation of a waveform may be also supplied to the microcomputer 90 without arranging the oscilloscope 86.

As mentioned above, the present invention has a synchronous interval judging device for judging that the existing interval of the synchronous signal detected by a synchronous detector lies outside a predetermined interval range. Accordingly, the linking gap of the optical disc can be detected immediately and exactly.

This application is based on Japanese Patent Applications No. 2002-195730 and No. 2002-176328 which are hereby incorporated by reference.

What is claimed is:

1. A linking gap detecting device for detecting a linking gap on an information recording track of an optical recording medium which has the information recording track and prepits on a recording face thereof, the information recording track in which marks indicating information data and marks each indicating a synchronous signal being formed, and the prepits being formed at intervals to indicate information relating to the information recording track between adjacent track portions of the information recording track, said linking gap detecting device comprising:
    a light beam irradiating device for irradiating a light beam to said information recording track;
    a light detector for receiving reflected light of the light beam irradiated to said information recording track to generate a light detecting signal;
    a synchronous detector for detecting a synchronous signal of the light detecting signal; and
    a synchronous interval judging device for judging whether an existing interval of the synchronous signal detected by said synchronous detector lies within a predetermined interval range or not;
    wherein the linking gap is detected on the basis of a result of the judgment by said synchronous interval judging device.

2. A linking gap detecting device according to claim 1, wherein said light detector has light receiving faces divided as first and second light receiving faces in the tangential direction of said track, and receives the reflected light of the light beam irradiated to said track on said first and second light receiving faces, and outputs first and second light receiving signals corresponding to the respective light receiving amounts of said first and second light receiving faces as the light detecting signal, and said synchronous detector detects the synchronous signal of an RF signal obtained by adding said first and second light receiving signals.

3. A linking gap detecting device according to claim 2, wherein said synchronous detector has a binary circuit for binarizing the RF signal, an NRZI converting circuit for NRZI-converting an output signal of said binary circuit, and a synchronous detecting circuit for detecting a portion corresponding to a mark length of the synchronous signal of an output signal of said NRZI converting circuit.

4. A linking gap detecting device according to claim 1, wherein the linking gap detecting device further comprises an error rate measuring circuit for measuring an error rate on the basis of the light detecting signal, and
    said synchronous interval judging device has a pulse generator for generating a pulse signal when it is judged that the existing interval of the synchronous signal lies outside said predetermined interval range, and an amplitude restraining portion for decreasing the amplitude of the light detecting signal supplied to said error rate measuring circuit during the generation of the pulse signal.

5. A linking gap detecting device according to claim 1, wherein said predetermined interval range is 55 μsec ±14T when the mark length of the synchronous signal is 14T (T is a unit mark length).

6. A linking gap detecting device according to claim 1, wherein the linking gap detecting device further comprises:
    an address detector for detecting the address of a position on said information recording track including the existing interval of the synchronous signal judged as the outside of said predetermined interval range by said synchronous interval judging device;
    a prepit detector for detecting the prepit on the basis of the light detecting signal; and
    a linking gap judging device for judging the position assigned by the address as a linking gap position when no relation of the position on the information recording track of the synchronous signal assigned by the address and the position of said prepit satisfies a predetermined condition.

7. A linking gap detecting device according to claim 6, wherein said address detector has a memory for storing the address of the position on the information recording track including the existing interval of the synchronous signal judged as the outside of said predetermined interval range by said synchronous interval judging device over said entire information recording track forming said marks therein.

8. A linking gap detecting device according to claim 6, wherein said predetermined condition is that said prepit is located in a time position approximately having a half of the time width of a detecting mark of the synchronous signal, and the existing interval of the synchronous signal lies within a predetermined time range.

9. A linking gap detecting device according to claim 6, wherein said predetermined condition is that the detecting center of said prepit detected by said prepit detector is located within ±259.25 nsec with respect to a time position having a half of the time width of a detected mark corresponding to the synchronous signal, and the existing interval of said synchronous signal lies within 55 μsec±0.518 μsec when the mark length of the synchronous signal is 14T (T is a unit mark length).

10. A linking gap detecting device according to claim 7, wherein said linking gap judging device sequentially judges whether or not said predetermined condition is satisfied with respect to each address stored into said memory, and said optical disc is set to lie outside a standard when it is judged that said predetermined condition is not satisfied.

11. A linking gap detecting device according to claim 6, wherein said prepit detector has a subtracter for calculating the difference between said first and second light receiving signals output from said light detector to generate a push-pull signal, and a high pass filter for passing a high frequency component of the push-pull signal to detect the prepit.

12. A linking gap detecting method for detecting a linking gap on an information recording track of an optical recording medium which has the information recording track and prepits on a recording face thereof, the information recording track in which marks indicating information data and marks each indicating a synchronous signal being formed, and the prepits being formed at intervals to indicate information relating to the information recording track between adjacent track portions of the information recording track, said linking gap detecting method comprising the steps of:

irradiating a light beam to said information recording track;

receiving reflected light of the light beam irradiated to said information recording track to generate a light detecting signal;

detecting a synchronous signal of the light detecting signal; and     judging whether an existing interval of the synchronous signal detected lies within a predetermined interval range or not;

wherein the linking gap is detected on the basis of a result of the judgment.

13. A linking gap detecting method according to claim 12, wherein the linking gap detecting method further comprises the steps of:

detecting the address of a position on said information recording track including the existing interval of the synchronous signal judged as the outside of said predetermined interval range; detecting the prepit on the basis of the light detecting signal; and     judging the position assigned by the address as a linking gap position when no relation of the position on said information recording track of the synchronous signal assigned by said address and the position of said prepit satisfies a predetermined condition.

* * * * *